Aug. 16, 1966     W. KREBS     3,266,936
ELECTRODE SUPPORTS AND METHOD FOR THEIR PRODUCTION
Filed March 18, 1964

INVENTOR
WILLI KREBS
BY Nolte & Nolte
ATTORNEYS

United States Patent Office 3,266,936
Patented August 16, 1966

3,266,936
ELECTRODE SUPPORTS AND METHOD FOR THEIR PRODUCTION
Willi Krebs, Wiesbaden, Germany, assignor to Societe des Accumulateurs Fixes et de Traction, Romainville (Seine), France
Filed Mar. 18, 1964, Ser. No. 352,893
9 Claims. (Cl. 136—53)

This invention relates to storage batteries and in particular to a method for the production of supports from metal fibers for holding the electrically active materials or masses of electrodes in electric storage batteries.

This application is a continuation-in-part of my application Serial No. 774,489 filed November 17, 1958, and now abandoned.

The term "metal fibers" as used in this specification and the appended claims is deemed to include metal wires, threads, chips, grains and the like shapes, the metal of which lends itself to the production of electrode supports.

Known storage battery electrode plates made from sintered metal powder for use with alkaline electrolytes frequently have disadvantages such as poor electrical conductivity, and poor mechanical stability after extended use due to the chemical reactions occurring during charge and discharge. Electrodes have consequently been introduced in which portions do not take part in the chemical reactions referred to, by e.g. using a substantially inert grid which may be made of an iron-nickel alloy and which is incorporated into the body of the electrode during production. In other known electrodes this inert support is produced by imbedding metal powder in a lattice or grid. When such a lattice or scaffolding is made of metal, it may serve both as a body for the electrode, as a conductive portion of the electrode body and as a conductor strip or terminal out of the electrode body. The disadvantage of these types of electrodes is that the imbedded particles and chemicals are easily separated and lost from the support lattice. As a result the internal impedance of the electrode may be raised. Such disattachment of part of the fine porous body of the electrode can occur due to changes in temperature. These disadvantageous manifestations have to be considered because during charging the formation of gases in the interior of the electrodes is inavoidable.

Other known electrodes employed with alkaline electrolytes use sheets or wire mesh on the inside of the electrode to support a porous metal powder sintered thereon. In such electrodes it has been suggested that the support be roughened before sintering the porous substances, so that the porous portion will be given a better hold on the surface of the sheet or mesh. This manner of preparation of an electrode, however, requires a metallic support of appreciable thickness which in turn results in an important fraction of the total electrode weight emanating from the support which later takes no part in the chemical reactions during charging and discharging of the accumulator. Further, on the outer surfaces of the electrode supports sintered metal powder layers of appreciable thickness are formed. These layers, however, do not possess sufficient stability. Also, the electrical current must travel an appreciable distance from the support to the outer zones of these layers, so that this type of electrode in the final result has disadvantages essentially similar to electrodes which merely comprise sintered metal powder without a support.

Finally, Patent No. 2,627,531 of Vogt discloses a porous support body for an electrode in which steel wool is first filled with a metallic oxide, and the impregnated body subjected to a sintering process in a reducing atmosphere to produce a rigid yet porous support for the electrode. Vogt's support body suffers the drawback of insufficient mechanical stability due to the tenuous adherence of the oxide to the steel fibers themselves and a relatively limited capacity due to the thickness of the steel or metallic fibers.

It is an object of this invention to overcome all these disadvantages common to known electrodes.

It is a further object of this invention to provide a lattice for firmly holding all the components of the electrode.

A still further object of the invention is to provide electrodes of improved capacity and reduced weight which are simple to manufacture at low cost.

Other objects and advantages of the present invention will become apparent from the following description.

Briefly, and in accordance with the invention, electrode supports are composed of a plurality of interconnected metal fibers bounded together to form a self-supporting mesh or lattice structure for holding the active electrode masses.

The metal fibers are oxidized to such an extent that the cross-sectional areas of the fiber cores are substantially decreased. The metal oxides formed during the oxidation process remain deposited on the metal fiber cores. The oxidized fibers are thereafter reduced and sintered together into the desired shape of an electrode to form an irregular pattern of metal fibers having small protuberances integrally bounded to the metal fibers proper. In this manner, the surface of the fibers is materially increased.

The fundamental difference between the present invention and the prior art structures is in the oxidation of the actual fibers themselves. Furthermore, due to the use of steel wool, which, because of the way it is made, does not possess uniformly thick fibers, the fine fibers will melt during the oxidizing process into globules within the fiber fleece which are converted into oxides during the processing.

If desired, the metal fibers may be first oxidized and thereafter combined or pressed into a cake or fleece whereafter the reduction and sintering takes place. However, it will be readily appreciated that the unoxidized metal fibers may first be brought together so as to form a fleece or cake of fibers whereafter the oxidation, the reduction and the sintering is carried out in this sequence.

Furthermore, the reduction and sintering may in practice constitute one single step, since the sintering may be performed in a reducing atmosphere.

The oxidation of the metal fibers may be performed to such an extent that extremely thin fiber cores of e.g. .001 mm. remain.

Since the surface area is considerably enlarged by the provision of the clefts and protuberances, and the lattice structure is strong and self-supporting it will oftentimes be sufficient to imbed the active electrode masses directly therein without introducing further reinforcing or surface-enlarging bodies. In this case the irregular surfaces of the fibers hold these active masses. However, if it should be desired to obtain more "body" for the support structure, it is feasible to introduce metal powders into the pores or spaces between the individual fibers. The metal particles of the powder will then be securely held within the lattice structure, by engaging in the clefts formed between the fibers and bearing against the protuberances. Since the protuberances are integral parts of the lattice structure, an excellent electrical connection between the lattice proper, the incorporated metal particles and the active substances is thus created. This connection is not affected by temperature variations or the formation of gas bubbles in the interior of the electrode during charging. Further, the active substances are securely lodged within the structure and are not washed out by the electrolyte.

The manner in which the above and other objects of the invention are accomplished will be described in greater detail hereinbelow with reference to the following drawings, wherein:

FIG. 1 indicates a method of oxidizing the fibers according to the invention.

Figure 1:
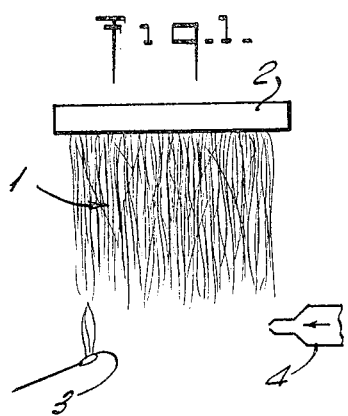

In FIGURE 1, a fleece of steel wool, indicated generally at 1, is shown hanging vertically from an iron clip 2. By way of example, the fleece may be 75–80 mm. x 150 mm. and weight about 3.00 grams. The vertically hanging fleece is ignited by means of a match 3 so that the fibers glow from the bottom upwardly. The finer fibers develop greater heat and melt together to form globules between the remaining fibers.

Fleece 1 may be burned in the presence of atmospheric oxygen alone, or, if desired, additional oxygen may be injected by means of a welding burner 4 for more rapid formation of the globules.

Figure 2:
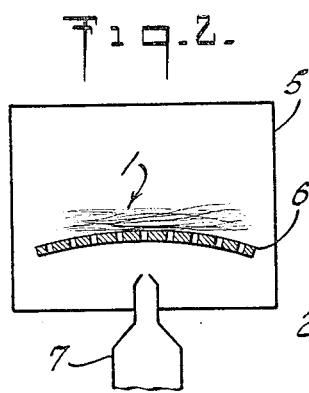
FIG. 2 illustrates a second method of oxidizing the fiber of the invention.

As an alternative the globule formation may be produced within a furnace 5 as shown in FIGURE 2. In this case, fleece 1 rests upon a heat resistant perforated metal support 6 at a furnace temperature of about 850° C. with the door open so that outside air can circulate freely. To augment and speed up the glowing effect, pure hydrogen may be injected at the bottom through a nozzle 7.

Figure 3:
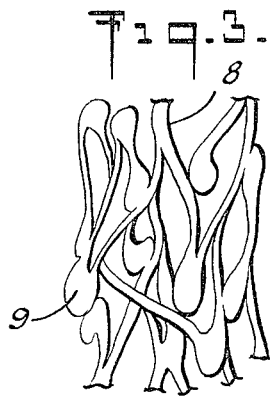
FIG. 3 is an enlarged view showing a portion of the fiber fleece after the oxidation process.

FIGURE 3 illustrates the globule formation of the fleece after one of the above procesing methods. In FIGURE 3, the relatively thicker fibers 8 remain in their original form, but the thin fibers have melted into small globules 9 interconnecting the remaining thick fibers to form a relatively rigid and mechanically stable structure.

Ordinary commercially-obtainable steel-wool can be used in accordance with the invention to produce fiber briquettes, since such wool contains steel fibers of different thickness in certain specified quantitative proportions. The steel-wool fleeces compressed in accordance with the inventive process consist of 5–15% fine steel fibers with an upper diameter limit of 0.01 millimeters; 60–90% medium steel fibers having a diameter of from 0.01 to 0.1 millimeters; and of 5–35% coarse steel fibers having a diameter of from 0.1–0.2 millimeters. Thus, the bulk of the steel-wool used consists in every case of medium thick steel fibers. The presence of a certain proportion of finer steel fibers is, however, absolutely necessary, since these melt during the oxidation process and bind together the medium-fine and coarse steel fibers which are only made to glow during this procedure, and thus help to form a strong but porous steel fiber framework. During the above-mentioned melting procedure the fine steel fibers produce the iron globules shown in FIGURE 3. During the after-glowing, these globules are converted into iron oxide globules.

By way of example, the following methods may be used to produce an electrode support body in accordance with the invention.

*Example A*

Fiber fleece portions of the size above mentioned were oxidized according to the method illustrated with reference to FIGURE 1 with the injection of additional oxygen through nozzle 4 for a glowing period of one minute. The fibers were made to glow slowly from the bottom upwardly under intense heat, and after the action of the heat has sufficed, the fleece is cooled off relatively rapidly. To obtain satisfactory oxidation, particularly of the globule like formation, the preoxidized fleece portions were again glowed, this time in the furnace (see FIG. 2) at 850° C. on a metal support. The average weight of the oxidized fleece members at this point was about 3.3 grams.

These fleece portions were then reductively treated in the glowing chamber under a steady stream of hydrogen at 850° C. The individual fleece portions may be sintered, or batches of three stacked on top of each other may be sintered together. Sintering may be accomplished between insulated iron sheets (cast iron insulated with layers of colloidal graphite) with layers of paper above the fleece portions. After the glowing chamber had cooled off, hydrogen being fed therein during the entire procedure, the reduced fleece portions dropped to a weight of about 2.9 grams. At this point, the globule like oxide formation was seen to be highly porous.

*Example B*

Three fleece portions with a total weight of 9.9 grams were oxidized according to the method of FIGURE 1 and sintered together in the manner above described. The sintering period was one and one half hours. After the reducing process, the total weight of these pieces was 7.5 grams. Such excessive reduction in weight may be accounted for by the fact that in view of their extremely thin structure, which may, for example, be in the neighborhood of 0.001 millimeters, part of the fiber cores may break during compression and not appear in the final product.

*Example C*

Three layers of fleece bands were arranged alternately, with the fibers in the middle layer running generally transverse to the upper and lower layers. The three layers were sintered together in the manner above described. Thereafter, individual portions measuring 73 mm. x 145 mm. were cut from the sintered plate and evenly matched at 8.0 grams. Subsequently, these pieces were oxidized in the chamber furnace for five minutes at 800° C. according to the method of FIGURE 2. After the same reducing treatment as above, the weight of the individual portions decreased to 7.8 grams. The reduction in weight may be explained similarly as in Example B.

The present invention is capable of producing an electrode having a water capacity approximately 85% greater than the prior art electrodes mentioned above. The extent to which the plate will absorb water is indicative of its ability to absorb the active substances of the electrode, which is decisive for the capacity of an alkaline accumulator. Consequently, in addition to a saving in weight the present process provides an electrode of significantly higher capacity.

Another distinction between the present electrode and that of the Vogt patent (supra) is the fact that in the invention $Fe_3O_4$ is formed on the fibers, while in Vogt $FeO$ or $Fe_2O_3$ is formed. Also, in Vogt the oxides adhere loosely to the fiber while the oxides of the present invention, known as mill scale, form a strong bond with the fibers and do not fall off even when subjected to severe jarring.

In addition to the improved product, the present process requires only a single short oxidation period of relatively low cost, without poisonous gas formation during the oxidizing process.

Figure 4:
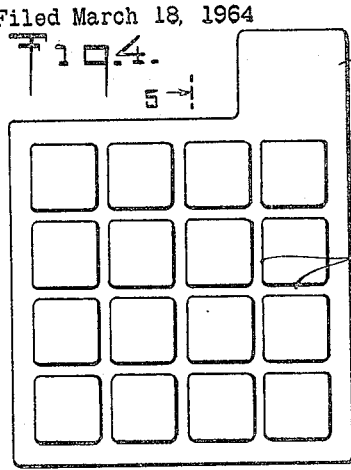
FIG. 4 is a view of a sintered electrode plate.
Figure 5:
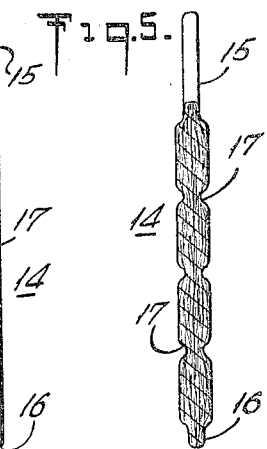
FIG. 5 is a cross section of FIG. 4 along line 5—5.

FIGS. 4 and 5 illustrate a sintered electrode plate which is produced from a plurality of interconnected threads as shown in FIG. 3, which have been pressed into the plate form of FIGS. 4 and 5.

The lattice 14 of the plate has flutes 17 which may provide anchoring for subsequent plate separators, while terminal 15 is used for electrical connections. The border 16 is pressed into a thinner cross section.

Figure 6:
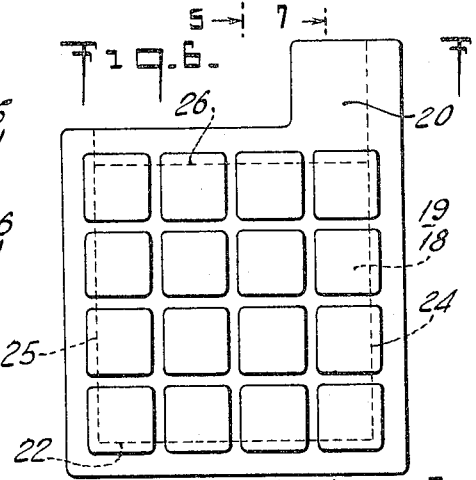
FIG. 6 is a view of a cavity sintered plate.
Figure 7:
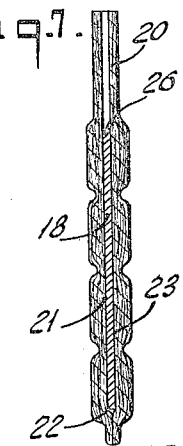
FIG. 7 is a cross section of FIG. 6 along line 7—7.

In FIGS. 6 and 7 lattice 19 is shaped externally similar to lattice 14. Sheet 18 bordered by face 21, face 23, bottom 22, side 24, side 25 and top 26 may be composed of activating substances, gas absorbing substances or any substance beneficial to the reaction alone or in combination.

Figure 8:
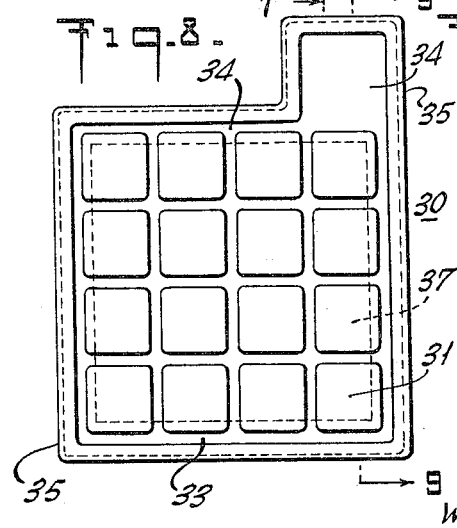
FIG. 8 is a view of an electrode plate with a cavity formed by two recesses.
Figure 9:
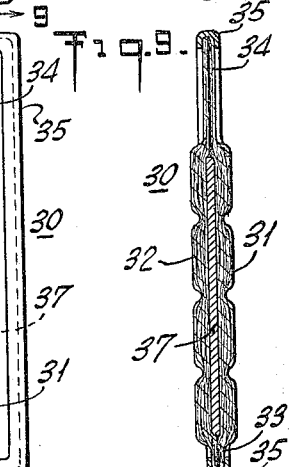
FIG. 9 is a cross section of FIG. 8 along line 9—9.

In FIGS. 8 and 9 lattice 30 is comprised of two halves 31 and 32 joined at bottom 33 and top 34 by casing 35 and may enclose sheets 37 which may comprise activating substances, gas absorbing substances, etc.

As previously mentioned and in accordance with one embodiment of the invention, the support lattice may be reinforced by incorporating therein a porous carrier, e.g. metal powder or metal oxide in powder form. This is advantageously done after the metal fibers have been cold-pressed into a fleece but prior to the sintering. During the sintering the metal powder particles become of course integrally bounded to the fibers proper. If metal oxides are introduced, the sintering has to be preceded by a reduction treatment or the sintering has to be performed in a reducing atmosphere.

Starting products for the preparation of the sintered electrodes according to the invention are very fine wires, fibers, threads, grains, chips or similar shapes preferably of great lengths which have a rough surface. The materials which may be used comprise for example iron, nickel alloys having a high percentage of iron, copper, and silver. A cheap material is, for example, the shavings producing by turning with diamonds. The shavings, however, may be produced in any other suitable manner, for example, through drawings, pressing, spraying, etc. However, it is important in all cases that a definite roughness on the fibers be present because this is necessary for further handling of the fibers for the attainment of a large surface area. Either before or after pressing into a shape of an electrode such roughened metal fibers or threads are purposely oxidized for example by treatment with pure oxygen or air and simultaneously heat treated until the surface area has had a coat of oxide built thereon. This oxidation can be produced by other means, such as by the wet treatment of the fibers with chemicals which cause oxidation of the metal fibers such as acids or other liquids followed by rapid drying. Annealing the oxides covering the surface areas in a hydrogen atmosphere reduces the oxides to the metallic state and bumpy appendages and clefts remain on the surface and increase the surface area. Dependent on the oxidation degree and the subsequent reduction the thread cores may be decreased to thicknesses of .001 mm.

The surface pattern is of course also influenced by the degree of the oxidation and reduction treatment.

Such jagged and rough metal threads are then woven or united into a strong fleece and cold-pressed into a cake in the form of a finished electrode plate. The comparatively large pores of the pressed cake or briquette may then be filled with metal oxides in a known manner. For this purpose the fiber briquettes may be impregnated with a suspension containing the respective metal oxides, such as nickel oxide, iron oxide, copper oxide, etc., in a volatile medium such as alcohol, ether, benzene, or the like. The filling of the pores may be effected in any other suitable manner such as pressing, drawing in under vacuum, vibration or similar processes. Volatile substances such as paraffin or salts, such as sodium chloride may also be added which, if desired, are removed after the annealing by rinsing or soaking or dissolving. Further, it is also feasible to add substances which liberate oxygen, such as 1 to 3 percent of potassium permanganate or the like which causes more rapid oxidation and sintering. The oxygen in the thread briquettes will be liberated and by a partial combustion of the metal a sudden temperature increase is produced, which in turn accelerates the oxidation and the sintering. The heating time is thus considerably reduced.

Pure metal powders with jagged surfaces may also be used for the impregnation of the fiber cakes.

The prepared fiber briquettes are then placed between forms or into molds and are sintered under pressure and heat in a shielding or reducing atmosphere to form electrode plates. In this manner, high-quality plates are produced out of inexpensive and readily available materials in a proportionately short time. These plates are very light and stable and their capacity is superior to present electrodes. The integral connection of the individual fibers to one another and the bonding of the metal particles to the lattice formed produce a very good electrical conductivity.

The sintering under pressure is advantageously carried out in equipment of cast iron of special composition which does not become distorted and conducts heat to such an extent that rapid cooling can be effected.

Positive as well as negative electrode plates can be produced in accordance with the invention. The physical shape of the plates can be made in any desired form, such as rectangular, round, cylindrical, columnar or similar. Cavity plates with hollowed-out recesses may also be produced for accommodating the active masses with metals or the like. The current flow or discharge may pass through sintered flag-shaped terminals whose stability is great enough so that they are easily worked by such means as bending, welding, boring, etc., without loss of stability. The thickness of the terminals should preferably be that of the border and the flutes of the sintered plate.

For practical purposes an electrode plate may for example be chosen as shown in FIG. 4 and in the cross section of FIG. 5. The total thickness of the plate 14 in the finishmed form can be about 3 mm. and the remaining dimensions may be similar to that of a common automobile starting battery, i.e. about 130 by 140 mm. For the preparation of such a plate only about 25 to 30 grams of iron metal thread are necessary.

The support body of the invention may be used to produce complete electrodes in the following manner.

*Example 1*

For the positive plate, iron fiber briquettes of the desired dimensions and in a thickness of approximately 5 mm. are formed from the individual fibers. These briquettes are then oxidized on the fiber surfaces and thereafter compressed under reducing conditions under pressure and heat to a thickness of about 2 mm., whereby the threads at the same time are sintered together. The metal threads or fibers are then galvanically coated with a layer of one or three microns of nickel. The fibers may also be nickle plated between the oxidation and reduction steps. The threads for the negative plate are treated in an analogous manner.

The thus prepared support plates are then activated. In known manner, the positive plate is impregnated at 20° C. with a saturated nickel nitrate solution and subsequently treated under vacuum with a 30% potash lye (potassium hydroxide) heated to 70° C., to precipitate nickel hydroxide in the pores of the plate. The negative plate is correspondingly soaked in cadmium salts and subsequently treated with hot potassium hydroxide to precipitate potassium hydroxide in the pores of the plate. These activation steps are repeated until the pores of the plates are filled with the respective hydroxides. Between each activating step the plate is washed and dried.

Dependent on how often the activating steps are repeated, the final weight of the finished plates is between 100 and 150 grams each. This means that from 70 to 120 grams of activated mass may be imbedded in 25 to 50 grams of support.

The terminal 15 is integral with the support plate proper and has the same thickness as the border 16 and the distance between the flutes 17, i.e. approximately 1 mm. The flutes 17 improve stability and serve to engage billets which may be placed between the plates and may be made of glass, plastics, such as mixed polymerization compounds of vinyl chloride and acrylic acid esters, polystyrol, or the like.

*Example 2*

From the same fibers as in Example 1, fiber briquettes are prepared as in Example 1, with the difference, however, that a relatively thin (0.5 to 1.6 mm.) insulated metal core or plate is placed in the middle of the briquette. The plate may be quadratic (120:120 mm.). The briquettes are then sintered together as described in Example 1. After the sintering the cores are pulled out and the electrode support plates are nickel plated and activated in a manner similar to that described in Example 1. The activated electrode plates are thus formed with a cavity as shown in FIGS. 6 and 7. This cavity is then filled out with sheet 18 containing activating substance. The sheet in addition to the active mass contains conductivity increasing materials such as carbon or a composition of carbon and metal powders, etc. The proportion of active mass to conductive material is approximately 70:30. That is 70% by weight of the material introduced into the hollow space of the electrode consists of nickel hydroxide or cadmium hydroxide, while 30% is carbon alone or in combination with metal fibers, metal powder, or the like. Sheets 18 may furthermore contain gas absorbing materials such as activated carbon, mercury oxides and similar materials. The inserted sheet 18 is held within the interior of the electrode plate by closing the upper border of the latter which may be accomplished by, for example, welding, riveting, screwing, etc.

This embodiment of the inventive electrode plate is made possible by the fact that the lattice structure is sufficiently strong and firm to be formed with a cavity which in turn accommodates active substances. In spite of the presence of the cavity, the lattice structure and the materials incorporated therein will remain intact and no material falls out from the lattice. The presence of the cavity has the advantage that on the one hand the electrode substance may constantly supplement and renew itself from within the electrode while on the other hand during charge of the battery first those portions of the electrode are charged which exhibit the smallest interior impedance. After these portions have been charged, the charging effect continues to the electrode substances accommodated within the cavity, after the polarization voltage has been built up in the electrode portions within the support lattice.

Further, gas formation upon overcharging of the battery is delayed because a great charging capacity is present in the filled cavity which is but slowly used up due to the high internal impedance. However, should gas formation occur, the active substance in the cavity is capable of absorbing the gases and to withdraw them from this important portion of the electrode.

*Example 3*

For the positive plates, iron fibers are used. These metal fibers are again, as in Example 1, worked into a fiber briquette of about 3 mm. thickness. This fiber briquette, as in Example 1, is oxidized on the surfaces and sintered together under a reducing atmosphere. The sintering is performed under pressure so as to obtain a support of about 1 mm. thickness. The center portion of the plates is sintered under greater pressure than the edge portion so as to obtain a central cavity of about 0.5 mm. thickness. A one micron silver coating is applied to the plates galvanically, chemically or by vaporization. Two similar plates are then combined whereby a cavity is produced in the plate as shown in FIGS. 8 and 9. This cavity is filled with active material such as silver powder or silver-coated iron powder or fibers. In addition, gas absorbing materials may be admixed. The two plates are fastened to one another by welding the border portions. Of course, any other suitable connection may be chosen.

For the negative plates, iron fibers are first oxidized in a manner similar to Example 1, and subsequently sintered under reducing conditions to form a plate of similar dimensions and shape as the positive plate. A zinc coating is applied before or after the reducing step. The negative plate may be formed without a cavity, and, after both plates are finished, they are activated.

In all embodiments the firmness or stability of the vanes or terminals should be sufficiently high so that they may be bent into even, current-conducting metal pieces. The individual vanes may be interconnected through screws, welding or the like.

It will be appreciated that the electrode plates may be produced in varying dimensions, for example, extremely small, so that they may be used in gas and fluid tight accumulator button cells.

The fibers may be coated galvanically with substances such as cadmium or nickel at any time before and also after sintering.

The inventive electrode plates possess all the characteristics which are expected from high-quality plates. The number of pores, the size and nature of the surfaces determine the reception of the active mass and, consequently, the capacity and quality of the battery. The inventive electrode plates are superior in this respect to known plates. The irregular surface pattern of the individual fibers from which the plate is composed prevents loss of the active substances since the latter are securely lodged within the support structure. From an economical viewpoint, the inventive electrode plates constitute a considerable saving of material while, at the same time, the weight of the battery is considerably reduced.

What is claimed is:

1. A method of producing support structures capable of holding the active masses of an electrode, comprising uniting a plurality of roughened metal fibers into a fiber fleece, oxidizing said metal fiber fleece until the cross-sectional area of the metal fibers of the fleece has been materially decreased and an oxide coat has formed on the fiber cores, reducing said oxidized fleece, whereby the surfaces of said fibers assume an irregular pattern of clefts and protuberances, and sintering said fleece into the form of a porous electrode plate.

2. A method as claimed in claim 1, wherein metal oxide powder is incorporated into said fleece prior to said reduction, whereby the oxidized metal fibers and the metal oxide powder are reduced by the subsequent reduction and the metal particles formed become integrally united with said metal fibers.

3. A method as claimed in claim 2, wherein said metal oxide powder is introduced into said fleece by soaking the fleece with a suspension containing a volatile inert fluid and said metal oxide powder.

4. A method as claimed in claim 2, wherein metal powder is incorporated into said fleece.

5. A support structure for the active mass of a battery electrode, comprising a sintered fleece of intertwined metal fibers, said fibers having a great number of integral clefts and protuberances formed therein caused by the oxidation and subsequent reduction of the fibers, and a plurality of small metallic globules uniting said fibers into a porous but rigid support body, said globules having been produced by the melting of fine fibers.

6. A support structure for the active mass of a battery electrode, comprising a fleece of intertwined metal fibers, said fibers having a great number of integral clefts and protuberances formed therein caused by the oxidation and subsequent reduction of the fibers, said fibers being sintered together so as to form a porous but rigid support body.

7. A method of producing a support structure capable of holding the active masses of an electrode for use with a storage battery, comprising the steps of uniting a plurality of roughened metal fibers into a fiber fleece, oxidizing said metal fiber fleece until the cross-sectional area of the metal fibers of the fleece has been materially decreased and an oxide coat is formed on the fiber cores, forming a briquette by simultaneously compressing and reducing said oxidized fleece, whereby the surface of said fibers assume an irregular pattern of clefts and protuberances, and simultaneously with said compressing and reducing steps, sintering said fibers together.

8. The method as claimed in claim 7, including the step of forming in said briquette a cavity during said compressing step for disposing therein a conductivity increasing material.

9. The method as claimed in claim 7, wherein the thickness of said briquette, after said sintering step, is from one millimeter to two millimeters.

References Cited by the Examiner

UNITED STATES PATENTS 2,627,531  12/1948  Vogt _____ 136—20
2,724,733  11/1952  Hagspihl et al. _____ 136—28

WINSTON A. DOUGLAS, *Primary Examiner.*

A. SKAPPARS, *Assistant Examiner.*